(12) United States Patent
Koma

(10) Patent No.: US 6,490,013 B2
(45) Date of Patent: Dec. 3, 2002

(54) VERTICAL ALIGNMENT LIQUID CRYSTAL DISPLAY HAVING IMPROVED DRIVING VOLTAGE CONTROL

(75) Inventor: Norio Koma, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/865,284

(22) Filed: May 24, 2001

(65) Prior Publication Data

US 2001/0028430 A1 Oct. 11, 2001

Related U.S. Application Data

(62) Division of application No. 09/196,001, filed on Nov. 19, 1998, now Pat. No. 6,304,304.

(30) Foreign Application Priority Data

Nov. 20, 1997 (JP) .............................................. 9-320189

(51) Int. Cl.⁷ .............................. G02F 1/133; G09G 3/36
(52) U.S. Cl. ........................................... 349/33; 345/94
(58) Field of Search .......................... 349/33, 34, 130, 349/132; 345/89, 94, 95, 96

(56) References Cited

U.S. PATENT DOCUMENTS

| | | | |
|---|---|---|---|
| 3,776,615 A | 12/1973 | Tsukamoto et al. ............ 345/94 |
| 5,153,702 A | 10/1992 | Aoyama et al. ............... 357/59 |
| 5,157,529 A | 10/1992 | Koopman et al. ............. 349/99 |
| 5,309,264 A | 5/1994 | Lien et al. .................... 349/179 |
| 5,408,246 A | 4/1995 | Inaba et al. .................... 345/89 |
| 5,495,287 A | 2/1996 | Kasai et al. ................... 345/89 |
| 5,579,142 A | * 11/1996 | Sawayama et al. ......... 349/113 |
| 5,640,259 A | 6/1997 | Sawayama et al. ........... 349/33 |
| 5,666,179 A | * 9/1997 | Koma ......................... 349/130 |
| 5,818,558 A | 10/1998 | Ogishima ................... 349/130 |
| 6,078,317 A | 6/2000 | Sawada ....................... 345/204 |
| 6,144,353 A | 11/2000 | McKnight ..................... 345/94 |
| 6,215,543 B1 | * 4/2001 | Mason et al. ................ 349/172 |

FOREIGN PATENT DOCUMENTS

JP 8-62585 * 3/1996

* cited by examiner

Primary Examiner—William L. Sikes
Assistant Examiner—Tarifur R. Chowdhury
(74) Attorney, Agent, or Firm—Hogan & Hartson, LLP (57) ABSTRACT

When using a LCD panel in a normally-black mode which controls, by using an electric field, the tilt direction of vertically-aligned liquid crystal molecules sandwiched between first and second substrates, the value of a voltage to be supplied to the liquid crystal layer for a black display is set in a range which is larger than 0 V, and, preferably, greater than an optical characteristics changing voltage Vth for the liquid crystal, and enables contrast of 50 or over. With this arrangement, it is possible to increase a response time of the liquid crystal when switching a vertically-aligned LCD from the OFF to ON states.

5 Claims, 8 Drawing Sheets

VERTICAL ALIGNMENT LIQUID CRYSTAL DISPLAY HAVING IMPROVED DRIVING VOLTAGE CONTROL

This is a divisional of application Ser. No. 09/196,001 filed Nov. 19, 1998, now U.S. Pat. No. 6,304,304, which application is hereby incorporated by reference in its entirety.

BACKGROUND OF THE INVENTION

1. Field of the Invention

The present invention relates to a liquid crystal display (LCD) which employs a voltage control birefringence method for controlling tilt directions of liquid crystal by using an electric field, and in particular to a driving circuit of such an LCD.

2. Description of the Prior Art

LCDs, in which liquid crystal is enclosed between a pair of substrates and a voltage is applied to the enclosed liquid crystal for desired display, are advantageously small and thin, and the power consumption thereof can be easily reduced. Due to these advantages, LCDs are widely used as displays in various office automation equipment, audio visual equipment, and portable or on-board devices.

In particular, a DAP (deformation of vertically aligned phase) LCD is proposed, which includes liquid crystal with negative dielectric constant anisotropy, and controls initial alignment of the liquid crystal molecules to be vertically-aligned by using a vertical alignment layer. Specifically, a DAP LCD employs one type of electrically controlled birefringence (ECB) methods, and controls transmittance and displayed colors of the light coming into the liquid crystal layer by utilizing a difference in a reflective index between the longer and shorter axes of a liquid crystal molecules, i.e., a birefringence phenomenon. A pair of substrates are provided each with a polarization plate attached on the outer surface thereof, such that their polarization directions are orthogonal to each other. When voltage is applied to the liquid crystal layer, linearly polarized light which has been introduced into the liquid crystal layer via the polarization plate on one side of the substrate is converted into elliptically or circularly polarized light due to birefringence of the liquid crystal layer, and is partly ejected from the polarization plate on the other side. Since the extent of birefringence of the liquid crystal layer, i.e., a phase difference (a retardation amount) between ordinary and extraordinary ray components of the incoming linearly polarized light, is determined according to the voltage applied to the liquid crystal layer, i.e., the intensity of an electric field caused in the liquid crystal, the amount of ejected light from the second polarization plate can be controlled for every pixel by controlling for every pixel the voltage applied to the liquid crystal layer. This eventually makes it possible to display a desired image as a whole.

A DAP LCD is originally superior in light transmittance as it utilizes birefringence, and can be made without a rubbing step in a manufacturing process as a result of improvement of a panel structure, or the like, of the display. Moreover, the display can have an improved viewing angle. However, when voltage is applied to vertically-aligned liquid crystal, tilt directions of the respective liquid crystal molecules may vary even though the tilt angles thereof are the same. Therefore, it takes some time until the liquid crystal molecules within one pixel region come to have the same tilt directions. This may problematically slow a response time of liquid crystal molecules with respect to the applied voltage.

SUMMARY OF THE INVENTION

The present invention has been conceived to overcome the above problems and aims to provide a driving circuit of an LCD which controls vertical and horizontal components for liquid crystal alignment by using an electric field. The driving circuit can improve response time of liquid crystal.

In order to achieve the above object, according to one aspect of the present invention, there is provided a liquid crystal display for controlling, by using an electric field, vertical components and horizontal components for alignment of liquid crystal sandwiched by a first substrate and a second substrate having electrodes for driving the liquid crystal, a lower limit value of a range for a driving voltage for application to the liquid crystal being set greater than 0 V. Preferably, the lower limit of a driving voltage to be applied to the liquid crystal is set at an optical characteristics changing voltage or over.

Further, in the above liquid crystal display, the lower limit value of the range for a driving voltage for application to the liquid crystal is set to so as to change while following a change, due to a temperature change, in an optical characteristics change voltage for temperature-dependent liquid crystal.

Still further, in the above liquid crystal display, the lower limit value of the range for a driving voltage for application to the liquid crystal is set so as to achieve a display contrast of 50 or over.

Still further, in the above liquid crystal display, the liquid crystal is set to have initial vertical or horizontal alignment having an initial tilt angle of approximately 0°.

Still further, in the above liquid crystal display, the electrode has an electrode-free region in a predetermined shape for controlling plan-direction components for the alignment of the liquid crystal by using a diagonal electric field caused at an edge of the electrode.

Still further, in the liquid crystal display, the liquid crystal is vertically-aligned.

According to another aspect of the present invention, in the liquid crystal display, the electrode for driving the liquid crystal formed on the first substrate includes a number of pixel electrodes provided in a matrix thereon; the number of pixel electrodes are connected to corresponding poly—Si thin film transistors each using a poly—Si layer formed at a low temperature for an active layer; and the liquid crystal is driven for each pixel electrode between the number of pixel electrodes and common electrodes for driving the liquid crystal formed on the second substrate.

For application to a color LCD, the upper limit of a voltage for driving the liquid crystal may be determined respectively for R, G, B for individual control of the transmittance of R, G, B components.

As described above, according to the present invention, it is possible to increase a response time of liquid crystal while maintaining high contrast by setting a range of a driving voltage to be applied to a liquid crystal layer at a value larger than 0 V. Also, high-quality display can always be achieved at various temperatures with an arrangement in which the lower limit of a voltage to be applied to the liquid crystal layer for an OFF display, which is set at a value equal to or above the optical characteristics changing voltage, is arranged to change while following the change of the optical characteristics changing voltage according to the ambient temperature of the display.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

In the following, a preferred embodiment of the present invention (hereinafter referred to as a preferred embodiment) will be described with reference to the accompanying drawings. In an LCD according to this embodiment, if the LCD uses a DAP LCD panel in which liquid crystal alignment is controlled by using an electric field, a response time thereof can be increased by controlling a driving voltage to be applied to the liquid crystal layer for color display with no voltage applied (here, black display) such that the lower limit thereof remains above 0 volts.

LCD Panel Structure

Figure 1:
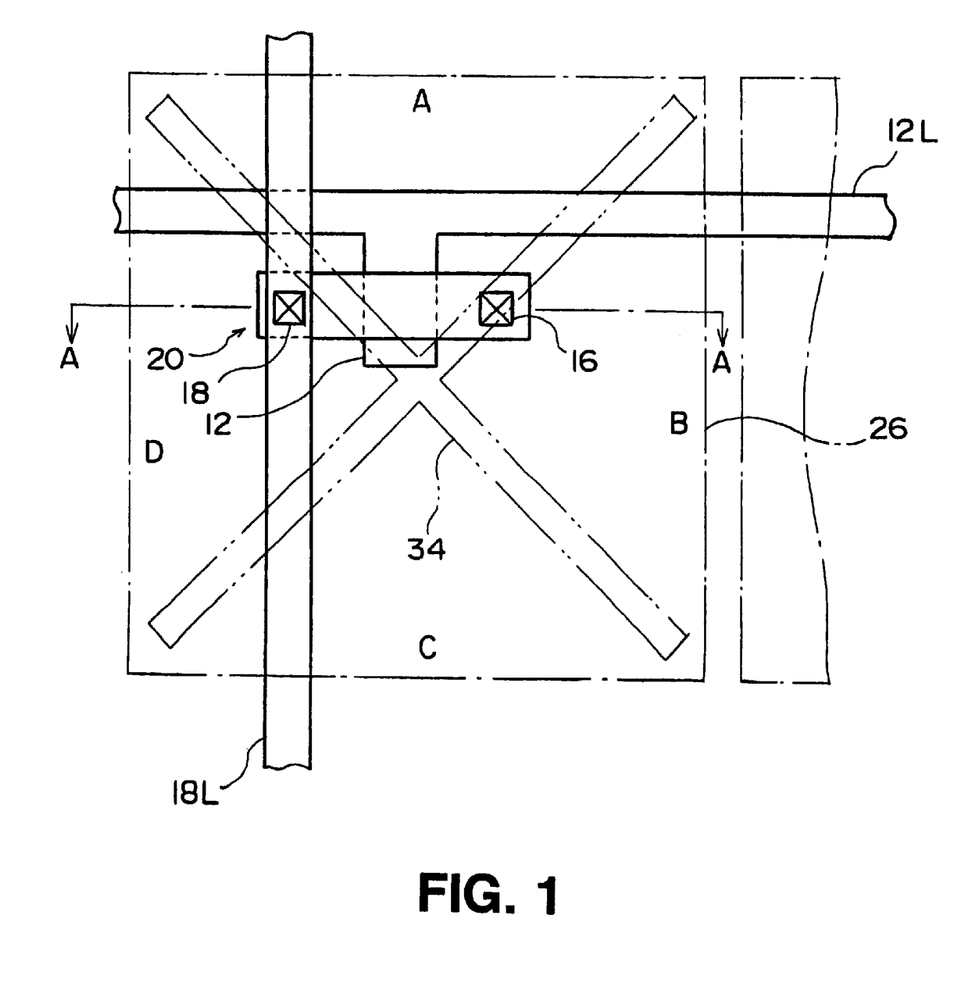
FIG. 1 is a conceptual plan view showing an example of a structure of an LCD panel according to a preferred embodiment of the present invention.
Figure 2:
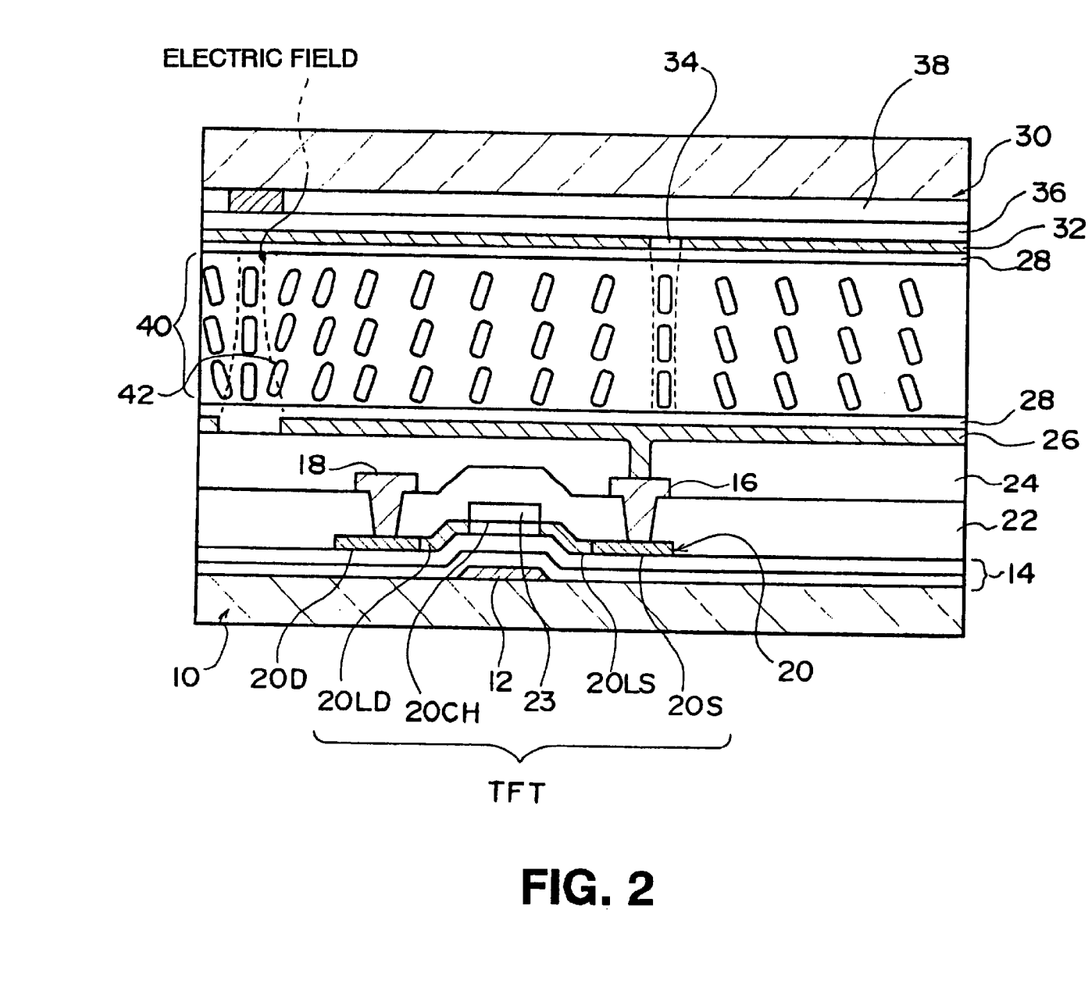
FIG. 2 is a schematic cross sectional view of the LCD along the A—A line in FIG. 1.

Referring to FIGS. 1 and 2, a structure of a DAP LCD panel to be driven will be described. FIG. 1 shows one example of a plan structure of an LCD panel; FIG. 2 shows one example of a schematic cross sectional structure of the LCD panel along the line A—A shown in FIG. 1. An LCD according to the preferred embodiment comprises a TFT substrate (a first substrate) 10 and an opposing substrate (a second substrate) 30. On the first substrate 10, a lower temperature poly silicon (p—Si) TFT is formed, above which a pixel electrode 26 is further formed. On the second substrate 30, which is provided opposing the first substrate 10 having a liquid crystal layer 40 in-between, a common electrode 32 is formed which has a direction control window 34 thereon. Further, polarization plates 44, 46 are attached to the outer sides of the respective substrates 10, 30 such that respective transmittance polarized light directions are orthogonal to each other.

More specifically, on the TFT substrate 10 which is made of glass or other material, there are formed a gate electrode 12 and a gate electrode line 12L which is integral to the gate electrode 12 in this embodiment. The gate electrode 12 and the line 12L are formed by patterning metal such as Cr, Ta, Mo, and so on. Further, covering the gate electrode 12 and the line 12L, a gate insulating film 14 is formed which is made of either one of SiNx and SiO$_2$ or layers of these materials stuck on top of each other. On the gate insulating film 14, a p—Si thin film 20 is formed to serve as an active layer of the TFT. The p—Si thin film 20 is formed by annealing, at a low temperature, an amorphous silicon (a—Si) thin film through both or either laser and/or lamp annealing for poly-crystallization and patterning into an island shape after annealing.

On the p—Si thin film 20, an implantation stopper (doping stopper) 23 is formed which is made of SiO$_2$ or other material. The doping stopper 23 is formed through self-alignment so as to a shape substantially identical to the gate electrode 12 when the TFT substrate 10 is exposed to light from its rear side (the bottom side in FIG. 2) while using the gate electrode 12 as a mask. Further, when impurities, such as, phosphorous or arsenic, are doped into the p—Si thin film 20 to be at a low concentration by using the injection stopper 23 as a mask, a low concentration source region 20LS and a low concentration drain region 20LD are formed through self-alignment on the respective sides of the region directly below the doping stopper 23, of the p—Si thin film 20. The low concentration source region 20LS and the low concentration drain region 20LD contain the doped impurities at a low concentration. The region directly below the doping stopper 23 of the p—Si thin film 20 contains no impurities because the doping stopper 23 served as a mask at the time of ion doping, so that the region constitutes an intrinsic region serving as a channel region 20CH of the TFT. Further, a source region 20S and a drain region 20D are formed on the outer sides of the low concentration source region 20LS and the low concentration drain region 20LD, respectively, from the doping stopper 23 when the identical impurities are further doped therein to be at a higher concentration.

On the doping stopper 23 and the p—Si thin film 20 where the respective regions (20CH, 20LS, 20LD, 20S, 20D) have been formed in the above processes, an inter-layer insulating layer 22 made of SiNx or other material is formed covering these regions. Further, on the inter-layer insulating film 22, a source electrode 16, a drain electrode 18, and a drain electrode 18L which is integral to the drain electrode 18 are formed, made of Al, Mo, or other material. The source electrode 16 and the drain electrode 18 are connected via contact holes opened throughout the inter-layer insulating film 22 to the low concentration source region 20S and the low concentration drain region 20D, respectively.

A low temperature p—Si TFT of this embodiment comprises the aforementioned gate electrode 12, the gate insulating film 14, the p—Si thin film 20 (20CD, 20LS, 20LD, 20S, 20D), the source electrode 16, and the drain electrode 18. The TFT further comprises an active layer made of a p—Si thin film 20 having been formed in low temperature processing. Although the above TFT is of bottom-gate type in which a gate electrode 12 is positioned on the lower side of the elements, a TFT is not limited thereto and may be of a top-gate type in which a gate electrode is formed in a layer above the p—Si thin film.

On substantially the entire part of the TFT substrate 10, a flattening inter-layer insulating film 24 of 1 $\mu$m or more thick is formed covering the above-structured TFT and inter-layer insulating film 22 for planarization of the top surface. A flattening inter-layer insulating film 24 is made of SOG (Spin on Glass), BPSG (Boro-phospho-Silicate Glass), acrylic resin, or other material. On the flattening inter-layer insulating film 24, a pixel electrode 26 is formed covering the TFT region, for driving the liquid crystal. An pixel electrode 26 is made of, in the case of a transmission display, a transparent conductive film, such as ITO (indium Tin Oxide), and connected via the contact hole formed throughout the flattening inter-layer insulating film 24 to the source electrode 16. For a reflection display, conductive reflective material, such as Al, may be used for a pixel electrode 26.

Also, on substantially the entire part of the TFT substrate 10, a vertically-alignment film 28 is formed covering the pixel electrode 26. The vertically-alignment film 28, which is made of a material, such as polyimide, serves as an alignment film for setting the liquid crystal molecules to have vertical alignment without a rubbing step.

The opposing substrate (the second substrate) 30, which is situated opposing the above TFT substrate 10 having the liquid crystal layer 40 in-between, is made of glass or other material, similar to the TFT substrate 10. On the surface of the opposing substrate 30 facing the TFT substrate 10, an RGB color filter 38 is formed. The filter 38 is covered by a protection film 36, such as acrylic resin, on which a common electrode 32, made of ITO or the like, is formed for driving the liquid crystal in corporation with the opposing pixel electrode 26. In this embodiment, the common electrode 32 has an electrode-free area formed as a direction control window 34 on a part thereof corresponding to the pixel electrodes 26 (described later). A direction control window 34 may have an X shape as shown in FIG. 1. Covering the common electrode 32 and the direction control window 34, a vertically-alignment film 28 is formed, similar to the TFT substrate 10.

The liquid crystal layer 40 is a crystal liquid layer enclosed in a space, for example, of 3–5 μm thick between the substrates 10, 30. The liquid crystal layer 40 is made of liquid crystal material having negative dielectric constant anisotropy, which has a larger dielectric constant in a shorter axial direction than in a longer axial direction of a liquid crystal molecule 42. Liquid crystal material for use in the liquid crystal layer 40 in this embodiment is a mixture of the liquid crystal molecules having fluorine for a side chain, expressed by the following chemical formulas (1) to (6), at a desired ratio so as to contain at least one type of these liquid crystal molecules.

Presently, liquid crystal molecules having cyano(CN—) for a side chain is mainly used as liquid crystal material with negative dielectric constant anisotropy for use in a TFT LCD including an a—Si active layer with low mobility. However, liquid crystal molecules with a cyano-based side chain must be driven by a sufficiently high voltage as they would otherwise be largely affected by a residual DC voltage. Moreover, those LC molecules have a poor voltage holding ratio, and may possibly cause image persistence.

On the other hand, this embodiment uses a p—Si TFT which was made using low-temperature processing and is adapted to be driven by a low driving voltage. If the presently used liquid crystal material having a cyano side chain (which must be driven by a high voltage), is used in this embodiment, the characteristics of the p—Si TFT, i.e., being adapted to be driven by a low driving voltage, cannot be utilized effectively. Therefore, the above mentioned liquid crystal molecules having fluorine for a side chain are adequately mixed for use in this embodiment. The resultant liquid crystal layer 40 is adapted to be driven by a voltage as low as approx. 2V, and can maintain a sufficiently high holding rate when driven by a low driving voltage through the p—Si TFT, and even prevent image persistence. Also, the resultant LCD has lower power consumption than an LCD which employs an a—Si TFT, because it can be driven by a lower voltage.

Also, the employment of liquid crystal material containing fluoride liquid crystal molecules with negative dielectric constant anisotropy and a vertically-alignment film 28 enables the use of an LCD in a normally-black mode in this embodiment, which controls liquid crystal to have vertical alignment at the initial stage. With the LCD in a normally-black mode, transmittance of the light incoming into the liquid crystal layer is controlled by utilizing a difference in refractive index between longer and shorter axes of a liquid crystal molecule, i.e., a birefringence phenomenon.

Further, since a direction control window 34, which is an electrode-free region in the common electrode 32, is formed, as shown in FIGS. 1 and 2, liquid crystal molecules are caused to tilt in a predetermined direction, using the direction control window 34 as a reference so that response of the LC molecules is improved. Moreover, since the alignment direction is resultantly divided within a single pixel due to the window 34, viewing angle dependency of liquid crystal display is modified, which makes it possible to achieve a display with a wider viewing angle.

Specifically, when a voltage is applied to the liquid crystal layer 40 (a white display) diagonal electric fields are generated between the edges of the pixel electrodes 26 and the common electrodes 32. The diagonal electric fields are actually diagonal in different directions in respective portions, as indicated by the broken line in FIG. 2. This causes the vertically-aligned liquid crystal molecules at the edges of the pixel electrodes 26 to tilt in a direction opposite to the diagonal direction of the electric field. Since liquid crystal molecules 42 have continuity, once the tilt direction of the liquid crystal molecules at the edge of the pixel electrode 26 is determined due to the diagonal electric field (the tilt angle is determined according to the electric field intensity), the liquid crystal molecules around the center of the pixel electrode 26 are accordingly caused to tilt in the similar direction. That is, when a pixel is driven, a number of regions are caused in a single pixel region, where liquid crystal molecules tilt in different directions.

On the other hand, liquid crystal molecules in an area corresponding to the direction control window 34 remain vertically-aligned, as shown in FIG. 2, since the direction control window 34 always receives a voltage less than a liquid crystal driving threshold value. As a result, the direction control window 34 always makes a boundary between the regions with liquid crystal molecules tilting in different regions. For example, with an X-shaped direction control window 34, as shown in FIG. 1, the boundaries for separating the regions A, B, C, D where liquid crystal molecules tilt in different directions are fixed on the X-shaped direction control window 34. With this arrangement, direction separation is successfully made within a single pixel region, and the boundaries for the separation can be fixed on the direction control window 34. Moreover, a number of (four in this embodiment, i.e., upper, lower, right, and left) priority viewing angle directions can be ensured, so that an LCD with a wider viewing angle can be provided.

Also, the pixel electrode 26 is provided on the inter-layer insulating films 22, 24, covering the region where the TFT and electrode lines thereof (gate electrode lines, drain electrode lines), and so on, are formed. Therefore leakage of electric fields generated by the TFT and its electrode lines into the liquid crystal layer 40 is prevented, as are the resulting effects on the alignment of the liquid crystal molecules. Further, a flattening inter-layer insulating film 24 can improve the planarity of the surface of the pixel electrode 26, and can prevent the disturbance to the alignment of liquid crystal molecules due to the uneven surface of the pixel electrode 26. With the above arrangement with a reduced leaking electric filed from the TFT and the electrode lines and the pixel electrode 26 with a more flattened surface, a step of rubbing the vertical alignment film 28 is unnecessary as the alignment of the liquid crystal molecules is controlled by a function of electric fields caused at the edge portions of the pixel electrode 26 and the direction control window 34.

Further, with the above arrangement in which the pixel electrode 26 is formed covering the TFT and respective electrode lines, an excessive alignment margin for the TFT and the lines is unnecessary. This can improve an aperture ratio.

Driving Circuit

Next, a driving circuit and method for improving a response time of the above-structured DAP LCD panel in a normally-black mode will be described.

Figure 3:
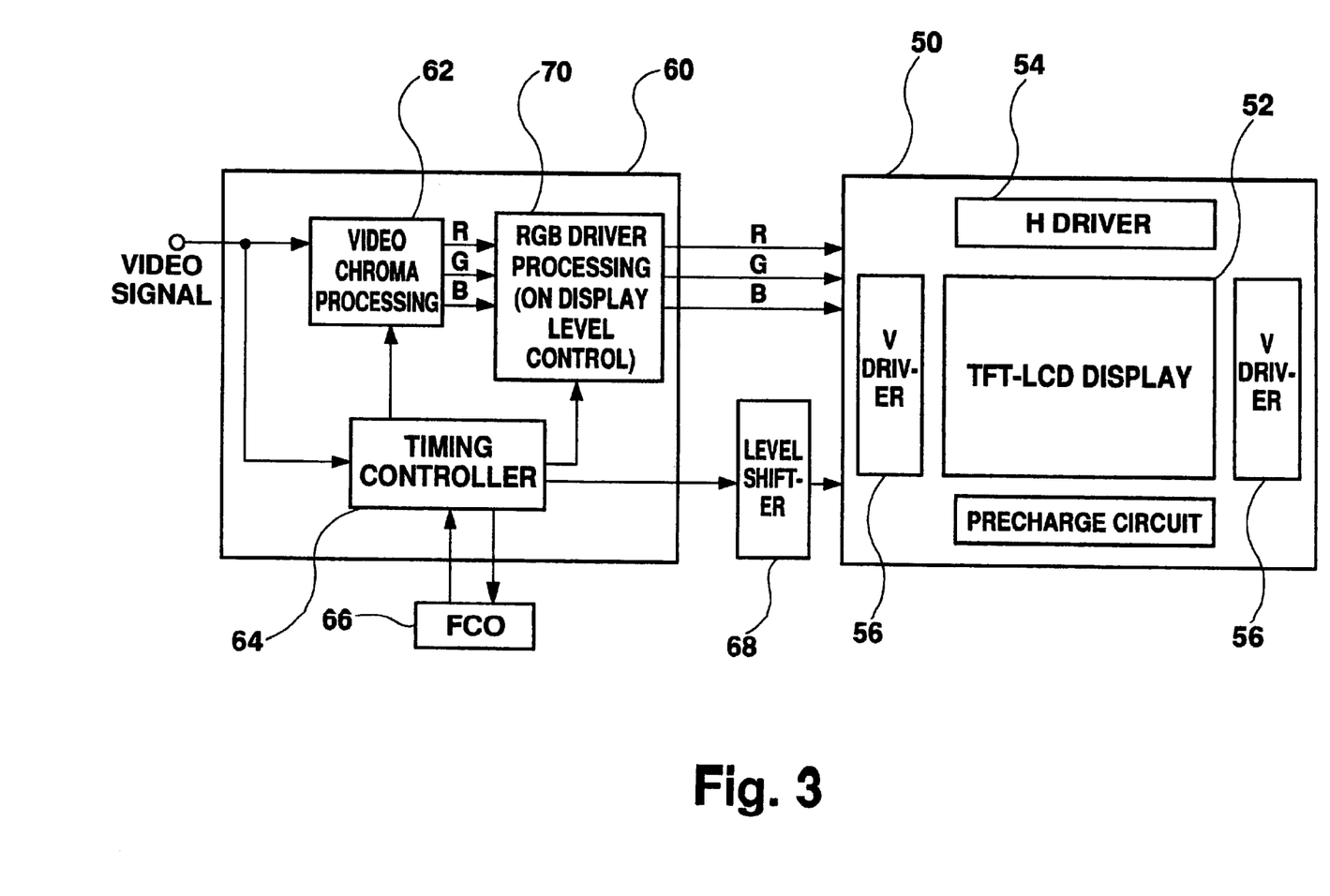
FIG. 3 is a block diagram showing a global structure of the LCD according to the preferred embodiment.

Referring to FIG. 3, which shows a global structure of an LCD of this embodiment, the LCD comprises an LCD panel 50 and a driving circuit 60 therefor.

The LCD panel 50 has a display area 52, where a TFT substrate and an opposing substrate sandwich a liquid crystal layer, as shown in FIGS. 1 and 2, and low temperature p—Si TFTs are formed as display TFTs on the TFT substrate side. Around the display area 52 on the TFT substrate, an H driver 54 and V drivers 56 are formed for horizontal and vertical selection of the display TFTs, respectively. These H and V drivers 54, 56 are formed using p—Si TFTs each having a CMOS structure. A p—Si TFT having a CMOS structure is formed in a process substantially same to the process for forming a p—Si TFT for the display area 52 whose channel, source, and drain can be formed through self-alignment. With the above panel structure, a rubbing step which may adversely affect the closely situated p—Si TFTs for the drivers 54, 56, can be omitted. This contributes to improving the yield of an LCD.

The driving circuit 60 of the liquid crystal panel 50 is constructed with integrating a video chroma processing circuit 62, a timing controller 64, and other components. The video chroma processing circuit 62 generates R, G, B video signals by using an input composite video signal. Using reference oscillation signals generated by a VCO 66, the timing controller 64 generates various timing control signals based on an inputted video signal, to supply to the video chroma processing circuit 62, an RGB driver processing circuit 70, a level shifter 68, or other circuits. Using R, G, B video signals supplied from the circuit 62, the RGB driver processing circuit 70 generates AC driving signals for R, G, B according to the characteristics of the TFT LCD, to output to the LCD panel 50.

In this invention, the lower limit of the range of a driving voltage to be applied to the LCD panel in a normally-black mode, i.e., a driving voltage to be applied to the liquid crystal layer for black display, is set at above 0 volts. Such control of a driving voltage for black display can be achieved, for example, by the RGB driver processing circuit 70 (described later).

Figure 4:
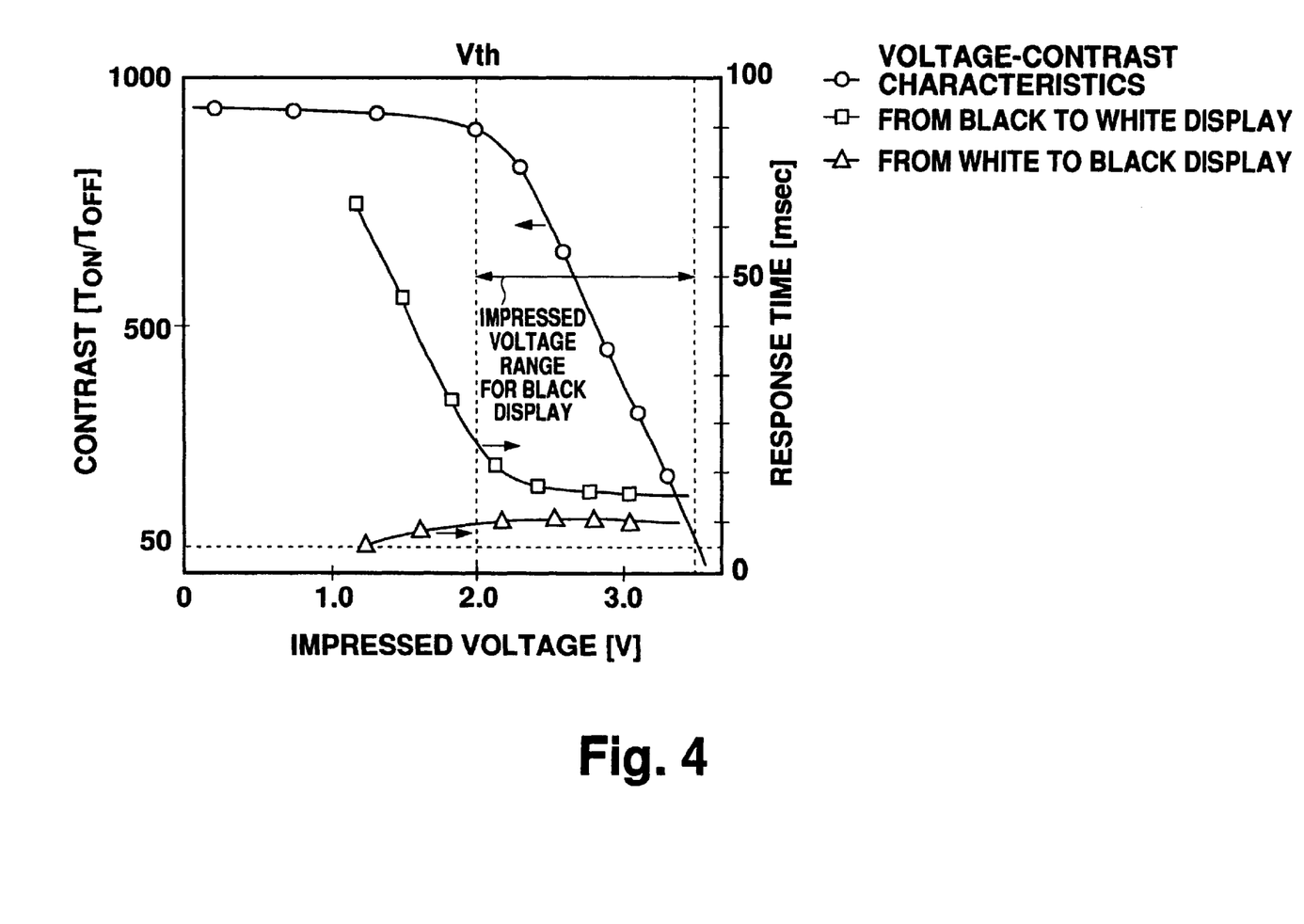
FIG. 4 is a graph showing the relationship between an impressed voltage, contrast, and a response time of the LCD according to the preferred embodiment.

Referring to FIG. 4, the relationship between an OFF impressed voltage [V] to be applied to a DAP LCD panel, as shown in FIGS. 1 and 2, and the contrast at that time ($T_{ON}$ (when transmittance is on)/$T_{OFF}$ (when transmittance is off), and that between an OFF impressed voltage and the response time of the liquid crystal [msec] are shown. Note that an OFF impressed voltage is a voltage necessary to maintain liquid crystal in an OFF state, i.e., in a not-operating state. With an OFF impressed voltage in a range between 0 V and approx. 2V, the liquid crystal molecules remains vertically-aligned, which is the initial alignment state, and the transmittance is therefore very low. The contrast at this time can be seen to be as high as 900 or over. With the voltage exceeding a value at which LC optical characteristics change (hereinafter referred to as an optical characteristics changing voltage), i.e., Vth (around an impressed voltage of approx. 2 V in FIG. 4), contrast begins to decrease. Specifically, in the example shown in FIG. 4, when the impressed voltage increases to approx. 3.5 V, contrast drops to approx. 50, which is generally considered as the lower limit for acceptable display quality.

On the other hand, as is shown in FIG. 4, a response time with respect to an impressed voltage presents significantly different characteristics between transitions from black to white displays (□ in FIG. 4) and vice versa (Δ in the same). In a transition from white to black display, i.e., from an ON to OFF state with an LCD in a normally-black mode, the response time is as short as 5–10 msec. However, in the inverted transition, i.e., from black to white display, or from OFF to ON state, a response time, i.e., a response time, differs significantly between a period with an OFF impressed voltage in a range between 0 V and less than the optical characteristics changing voltage Vth (with an impressed voltage of approx. 2 V in FIG. 4) and a period with an OFF impressed voltage equal to or over Vth. Specifically, the response time of liquid crystal is as long as 75–30 msec with an impressed voltage in a range between 0 V and less than Vth, and approx. 20 msec with an impressed voltage at Vth or over.

In view of the above, it is presumed that high-quality display is almost impossible to achieve in switching from black to white display if an OFF impressed voltage to be applied to the liquid crystal layer for black display is lower than approx. Vth because a sufficiently high response time cannot be achieved under such a condition. However, if the lower limit of an impressed voltage is set at larger than 0 V when using a DAP LCD panel, a response time in transmission from black to white display can be increased. In order to increase the response time to a fully satisfactory level, such as approx. 20 msec or less, an OFF impressed voltage as large as the optical characteristics changing voltage Vth or more is preferably applied. Further, the upper limit of an OFF impressed voltage is preferably set such that, for example, contrast of 50 or more can be achieved. With contrast of 50 or more, display quality can be made at a satisfactory level. When an OFF impressed voltage is set as above, high-contrast liquid crystal display with high speed response can be realized. Also, since the optical characteristics changing voltage Vth is temperature-dependent, an impressed voltage for black display is preferably determined so as to change while following the change of Vth due to a temperature change, when the impressed voltage is determined by using Vth as a reference, so that the optimum liquid crystal display can be always attained.

Figure 5:
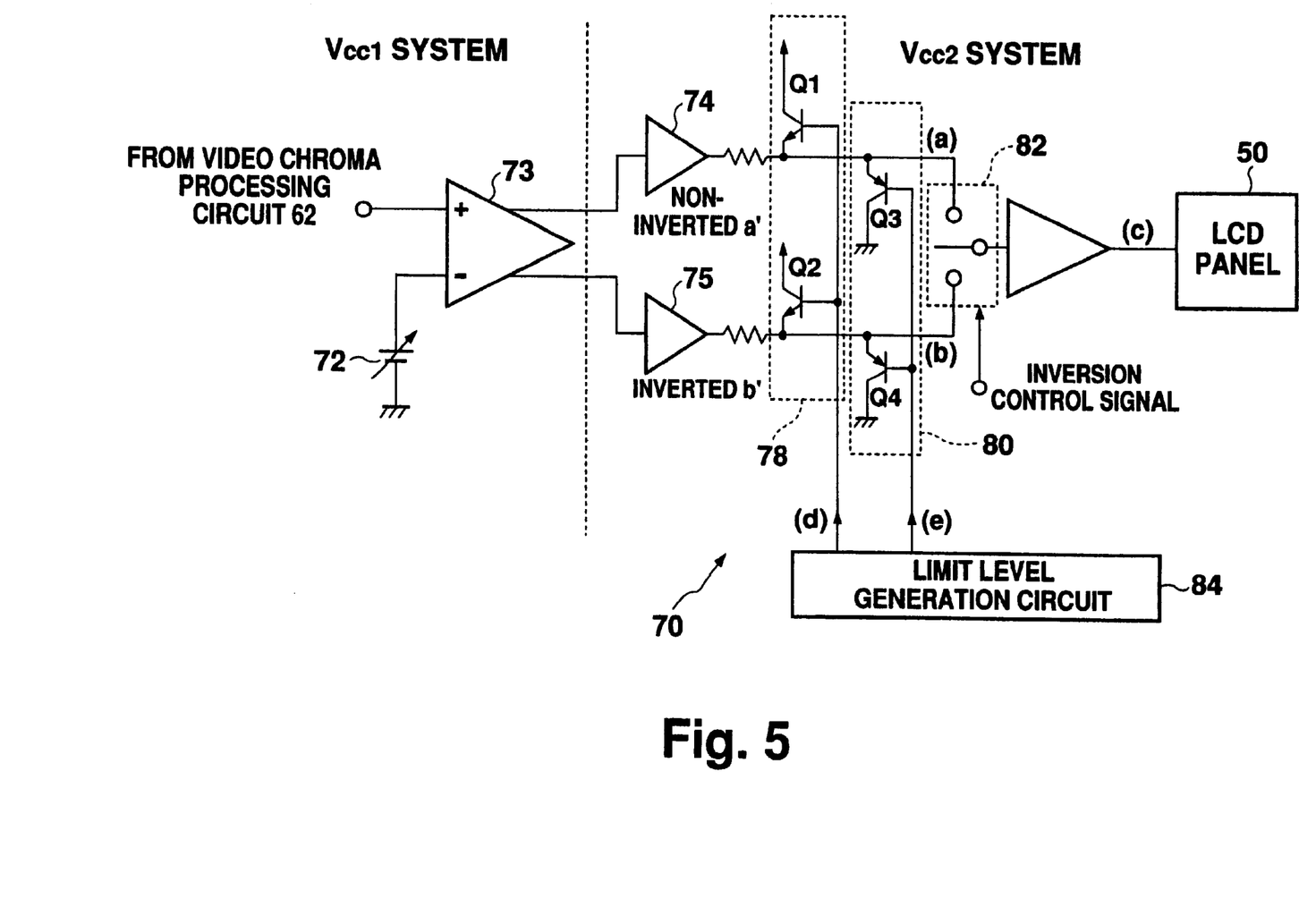
FIG. 5 is a schematic diagram showing a structure of an RGB driver processing circuit 70 shown in FIG. 3.
Figure 6:
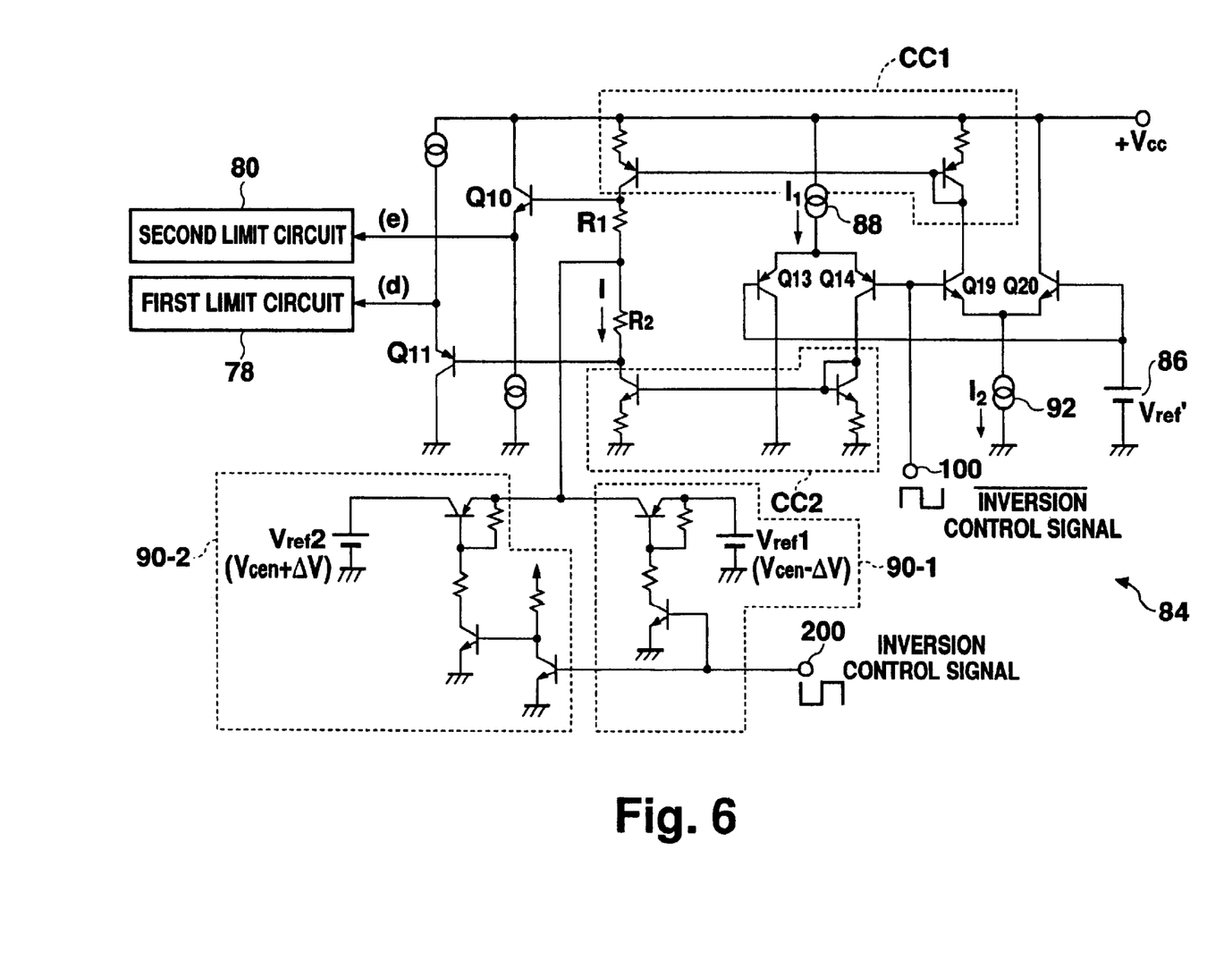
FIG. 6 is a diagram showing a structure of a limit level generation circuit 84 shown in FIG. 5.
Figure 7:
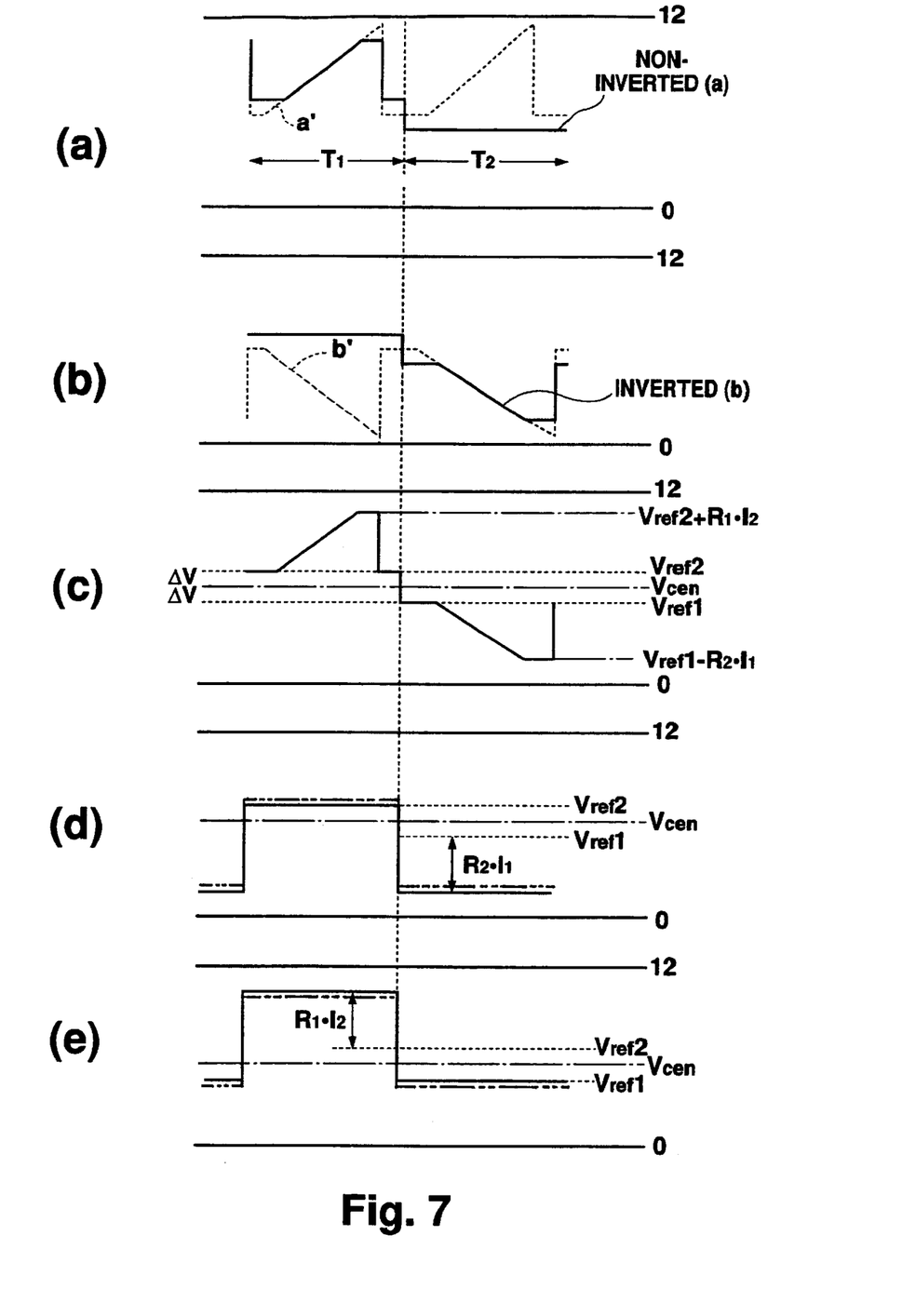
FIG. 7 is a diagram showing waveforms of signals in the circuit shown in FIG. 5.

FIG. 5 shows a structure of the RGB driving processing circuit 70 for any one of the R, G, B colors, which controls a driving voltage range. Note that RGB driving processing circuit 70 of the structure shown in FIG. 5 is provided for each R, G, B. FIG. 6 shows a structure of a limit level generation circuit 84 shown in FIG. 5. FIG. 7 shows the waveform of a signal which is changed in the RGB driver processing circuit 70.

Video signals for R, G, B outputted from the video chroma processing circuit 62 shown in FIG. 5 are supplied to corresponding differential output amplifiers 73. In the differential output amplifier 73, the signals are subjected to brightness adjustment to change the signals so as to have a DC voltage which is determined based on the voltage of a bias circuit 72. The differential output amplifier 73 outputs a non-inverted signal and an inverted signal to a first buffer 74 and a second buffer 75, respectively. The first buffer 74 outputs a non-inverted output signal a' having a waveform indicated by the broken line in FIG. 7(a); the second buffer 75 outputs an inverted output signal b' indicated by the broken line in FIG. 7(b). These signals a' and b' are then supplied to a first limit circuit 78 and subsequently to a second limit circuit 80 before being outputted to a multiplexer 82. The first and second limit circuits 78 and 80 define the lower and upper limit levels of the signals a' and b', for every cycle (T), as is indicated by the solid line in FIGS. 7(a) and (b). The multiplexer 82 alternately selects a non-inverted output signal (a) and an inverted output signal (b), applied via circuits 78 and 80, for every cycle (a period T1, T2) based on an inversion control signal, and the selected signal is outputted via a buffer to the LCD panel 50 as an AC driving signal (c) for driving the liquid crystal.

The first limit circuit 78 comprises a transistor Q1 and a transistor Q2. Transistor Q1 is connected in a signal path between the first buffer 74 and the multiplexer 82; and transistor Q2 is connected in a signal path between the second buffer 75 and the multiplexer 82. The transistors Q1 and Q2 receive, in their bases, a first level control signal (d) having the waveform shown in FIG. 7(d) from a limit level generation circuit 84 (described later). The second limit circuit 80 comprises a transistor Q3 and a transistor Q4. Transistor Q3 is connected in a signal path between the first buffer 74 and the multiplexer 82, and the transistor Q4 is connected in a signal path between second buffer 75 and multiplexer 82. Transistors Q3 and Q4 receive, in their bases, a second level control signal (e) having a waveform shown in FIG. 7(e) from a limit level generation circuit 84 (described later). In response to voltages determined based the signals (d) and (e), the transistor Q1 of the circuit 78 and the transistor Q4 of the circuit 80 operate to define the level of a non-inverted output signal (a) and an inverted output signal (b), so that the black display level of the voltage (absolute value) applied to the liquid crystal layer remains at a predetermined level which is larger than 0 V.

In response to voltages determined based on the signals (d), (e), the transistor Q2 of the circuit 78 and transistor Q3 of the circuit 80 operate to limit the level of a non-inverted output signal (a) and an inverted output signal (b) so that the white display level of the voltage (absolute value) applied to the liquid crystal layer remains at a predetermined level or below. Note that although the transistors Q2 and Q3 of the first and second limit circuits 78 and 80 are not indispensable in this embodiment, they can be provided in the above to control, the upper and lower levels of inverted and non-inverted signals so as to control the white display level applied to the liquid crystal layer and to remain within a predetermined range for preventing an excessive voltage from being applied to the multiplexer 82, and for enhancing synchronicity between the upper and lower levels of an AC driving signal (c).

Next, the structure of limit level generation circuit 84 will be described with reference to FIG. 6. In response to an inversion control signal which inverts the level thereof for every cycle (T) of being supplied to terminal 100, the limit level generation circuit 84 outputs a first level control signal (d) which varies the level thereof from the emitter of transistor Q11, and a second level control signal (e) which similarly varies the level thereof from the emitter of a transmitter Q10.

When the voltage of an inversion control signal supplied to terminal 100 is H level which is higher than the voltage Vref of the reference power source 86, the transistor Q19 is turned on, and a current I which is substantially equal to current $I_2$ supplied from a constant current source 92 is caused to flow over the resistor R1 by the first current mirror circuit CC1. At the same time, the inversion control signal supplied to terminal 200 is L level, so that a reference power source 90-2 (Vref2) is selected and connected to the resistor R1. As a result, the base potential of the transistor Q10 is equal to a value "Vref2+$R_1 \cdot I_2$", and the transistor Q10 outputs a corresponding second level signal (e) from its emitter. Also, since the transistor Q14 is then in an OFF state, no current flows in the second current mirror circuit CC2. Therefore, the base potential of the transistor Q11 remains equal to the voltage "Vref2", of the reference power source 90-2, and the transmitter Q1 outputs a first level control signal (d) from its emitter.

On the other hand, when the voltage of an inversion control signal supplied to terminal 100 is L level lower than the voltage Vref of reference power source 86, transistor Q14, which makes a differential pair with PNP transistor Q13, is turned on. A current I which is substantially equal to the current $I_1$ supplied from current source 88 is then caused to flow through resistor R2 by a second current mirror circuit CC2. At the same time, the inversion control signal supplied to terminal 200 is H level, so that a reference power source 90-1 (Vref1) is selected and connected to the resistor R2. As a result, the base potential of the transistor Q11, which is connected to resistor R2, is equal to a value "Vref1−$R_2 \cdot I_1$" (FIG. 7(d)) due to the voltage drop at the resistor R2, and the transistor Q11 outputs a corresponding first level signal (d)

from its emitter. Also, since transistor Q19, which makes a differential pair together with an NPN transistor Q20, is then in an OFF state, no current flows in the first current mirror circuit CC1. Therefore, the base potential of transistor Q10, which is connected between an output transistor of the first current mirror circuit CC1 and the resistor R1, remains equal to the voltage "Vref1" of the reference power source 90-1, which is connected to the other end of the resistor R1. As a result, the transistor Q10 outputs a second display level control signal (e) shown in FIG. 7(e) from the emitter thereof.

Waveforms of the first and second level control signals (d) and (e) are shown with a double-dotted chain line in (d) and (e) of FIG. 7. Waveforms shown with a solid line in (d) and (e) of FIG. 7 are base voltage waveforms and coincide with limit levels for the non-inverted and inverted signals (a), (b).

Having received inverted and non-inverted signals from the second limit circuit 80, multiplexer 82 alternatively selects the signals. When the inversion control signal is L level and the multiplexer 82 selects a non-inverted output signal (a) (a period T1 in FIG. 7), since the limit level at the transistor Q1 of the first limit circuit 78 is set at the value "Vref2", the lower limit level (the black display level at the period T1) of non-inverted output signal (a) is resultantly controlled so as not to be lower than "Vref2". Moreover, since upper limit level at transistor Q3 is set at the value "Vref2+$R_1 \cdot I_2$", the upper limit level (the white display level at the period T1) of non-inverted output signal (a) is resultantly controlled so as not to exceed "Vref2+$R_1 \cdot I_2$". In addition, since the transistor Q2 of the first limit circuit 78 controls an inverted output signal (b), which is then not selected by multiplexer 82, so as to remain below "Vref2", generation of excessive voltages at a part between the switching terminals of the multiplexer 82 can be prevented.

On the other hand, when the inversion control signal is H level and multiplexer 82 selects an inverted output signal (b) (a period T2 in FIG. 7), since the limit level for the transistor Q2 of the first limit circuit 78 is set at the value "Vref1−$R_2 \cdot I_1$", the lower level (the white display level at the period T2) of an inverted output signal (b) is resultantly controlled so as not to be below "Vref1−$R_2 \cdot I_1$". Moreover, since the limit level at transistor Q4 of the second limit circuit 80 is set at the value "Vref1", the upper level (the black display level at the period T2) of an inverted output signal (b) is controlled so as not to exceed "Vref1". In addition, since the transistor Q3 of the second limit circuit 80 controls a non-inverted output signal (a), which is then not selected by the multiplexer 82, so as not to exceed the value "Vref1", generation of excessive voltages at a part between the switching terminals of the multiplexer 82 can be prevented.

Since the circuits operate as described above, the signal supplied to LCD panel 50 from the multiplexer 82 via a buffer is controlled, so that the black display levels at periods T1 and T2 are respectively controlled to be equal to or greater than Vref2, or to be equal to or less than Vref1.

Note that the above described control over the black display level of a liquid crystal driving voltage so as to remain above 0 V, preferably, in a range of Vth–Vc50 (vc50: an impressed voltage achieving contrast of 50) can be achieved by setting the resistance values of resistors R1 and R2 of limit level generation circuit 84 and the voltage Vref1 (=Vcen−ΔV), Vref2 (=Vcen+ΔV) of the reference power sources 90-1, 90-2 at desired values. Also, the voltage of the black display level can be set so as to change while following the change of the value Vth due to a temperature change, by setting appropriate voltages "Vref1", "Vref2" of the reference voltage sources 90-1, 90-2 according to a change of temperature.

Note that, although an LCD panel to be driven in the above is a vertically-aligned DAP LD panel in a normally-black mode, an LCD panel with a slower switching speed between ON and OFF states, such as an NW (normally-white) LCD or a twisted-nematic type in which liquid crystal molecules initially have a horizontal alignment with a tilt angle of 0°, may be used to produce the same advantage. That is, the same advantage because the response time of the liquid crystal can be increased by setting the lower limit of an impressed voltage for driving the liquid crystal to a value greater than 0 V.

Figure 8:
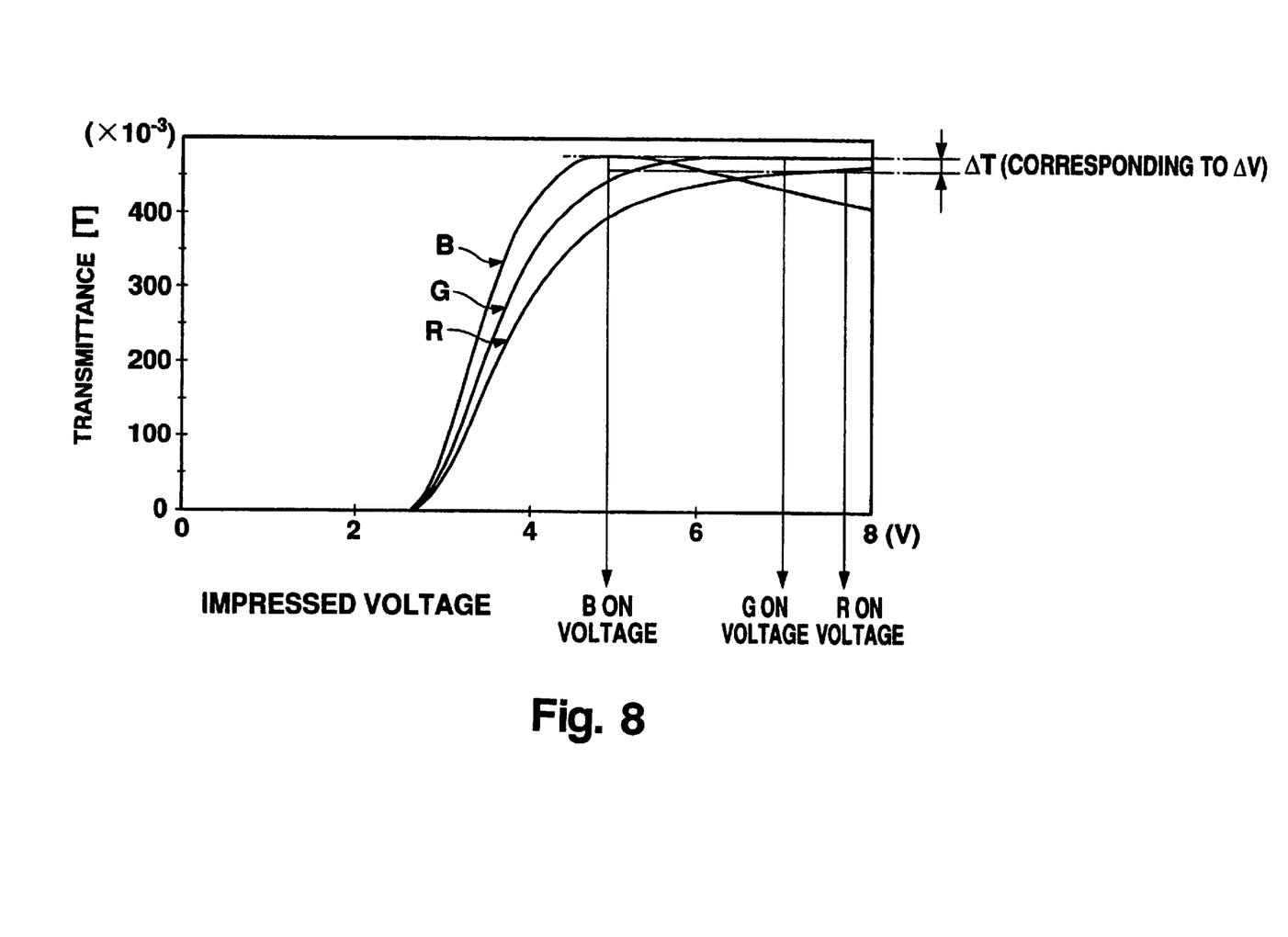
FIG. 8 is a diagram showing wavelength dependency of an impressed voltage and transmittance with the LCD panel according to the preferred embodiment.

Also, when constructing a color LCD by using a device of this embodiment, a white display level may be controlled for every color, or R, G, B, by the transistors Q2, Q3 of the first and second limit circuits 78 and 80 for compensation of a difference in transmittance among respective color components as each color component has a different relationship between an impressed voltage (a liquid crystal ON impressed voltage, a white display level) and transmittance. FIG. 8 shows the relationship between an impressed voltage [V] and transmittance [T] for every color component. In order to achieve substantially equal transmittance for R, G, B color components, a liquid crystal driving level for the maximum transmittance, i.e., a white display voltage level for turning on the liquid crystal pixels in a normally-black mode, must be set, for example, at approx. 7.8 V for R, approx. 7 V for G, and approx. 4.9 V for B, as an ECD LCD has wavelength dependency, when the respective color components have the characteristics shown in FIG. 8. With this setting, the white color can be precisely reproduced for color display through combination of R, G, B light.

What is claimed is:

1. A vertical alignment type liquid crystal display for controlling, using an electric field, vertical components and horizontal components for alignment of liquid crystal sandwiched by a first substrate and a second substrate having electrodes for driving the liquid crystal, comprising:
    a lower limit level restricting circuit for restricting a lower limit level of a driving voltage applied to the liquid crystal so as to prevent an OFF voltage corresponding to a lower limit voltage of the driving voltage from dropping below a predetermined value, wherein the liquid crystal includes liquid crystal molecules having fluorine for a side chain.

2. The vertical alignment type liquid crystal display according to claim 1, further comprising an upper limit level restricting circuit for restricting an upper limit level of the driving voltage so as to prevent the OFF voltage of the driving voltage from exceeding a predetermined value.

3. The vertical alignment type liquid crystal display according to claim 1, wherein the lower limit level of the driving voltage is set greater than 0V.

4. The vertical alignment type liquid crystal display according to claim 1, wherein the lower limit level of the driving voltage is set at an optical characteristics changing voltage.

5. The vertical alignment type liquid crystal display according to claim 1, wherein a driving a voltage output to a liquid crystal layer has an OFF voltage period in each cycle.

* * * * *